US009733927B2

(12) United States Patent
Dolby et al.

(10) Patent No.: US 9,733,927 B2
(45) Date of Patent: Aug. 15, 2017

(54) DETECTION OF SOFTWARE OR HARDWARE INCOMPATIBILITIES IN SOFTWARE PACKAGES

(71) Applicant: International Business Machines Corporation, Armonk, NY (US)

(72) Inventors: Julian T. Dolby, Bronx, NY (US);
Pietro Ferrara, White Plains, NY (US);
Marco Pistoia, Amawalk, NY (US);
Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/937,924

(22) Filed: Nov. 11, 2015

(65) Prior Publication Data

US 2017/0131999 A1 May 11, 2017

(51) Int. Cl.
*G06F 9/44* (2006.01)
*G06F 9/445* (2006.01)

(52) U.S. Cl.
CPC . *G06F 8/70* (2013.01); *G06F 8/61* (2013.01)

(58) Field of Classification Search
CPC .......................... G06F 8/61; G06F 8/70–8/71
USPC ......................................................... 717/120
See application file for complete search history.

(56) References Cited

U.S. PATENT DOCUMENTS

| | | | | |
|---|---|---|---|---|
| 5,485,616 A * | 1/1996 | Burke | ..................... | G06F 8/434 717/133 |
| 6,874,020 B1 * | 3/2005 | Da Palma | ............... | G06F 9/548 709/202 |
| 7,076,804 B2 * | 7/2006 | Kershenbaum | ......... | G06F 21/53 713/167 |
| 7,237,236 B2 * | 6/2007 | Kershenbaum | ........... | G06F 8/72 717/151 |
| 7,640,532 B2 * | 12/2009 | Jain | ........................... | G06F 8/20 717/102 |
| 7,706,687 B1 * | 4/2010 | Monga | .................... | H04L 12/24 398/25 |

(Continued)

FOREIGN PATENT DOCUMENTS

WO 2014041561 A2 3/2014

OTHER PUBLICATIONS

Shared Substance:Developing Flexible Multi-Surface Applications—Tony Gjerlufsen,Clemens Klokmose,James Eagan,Cl'ement Pillias,Michel Beaudouin-Lafon—Department of Computer Science,Aarhus University, Aarhus, Denmark—LRI & CNRS,Univ. Paris-Sud, Orsay, France—INRIA,Orsay, France—CHI 2011 • Session: Developers & End-user Programmers—May 7-12, 2011. CAN.*

*Primary Examiner* — Francisco Aponte
(74) *Attorney, Agent, or Firm* — Aaron N. Pontikos; Edward J. Wixted, III

(57) ABSTRACT

In an approach for determining compatibility between a computing device and a software application, a processor receives code of a software application. A processor generates a call graph for the software application using the code, wherein the call graph describes at least a first type of hardware component required to execute the software application. A processor identifies a set of one or more hardware components included within a computing device. A processor determines whether the computing device is compatible with the software application based on, at least, the call graph and the determined set of one or more hardware components included within the computing device.

18 Claims, 4 Drawing Sheets

(56) References Cited

U.S. PATENT DOCUMENTS

| | | | | |
|---|---|---|---|---|
| 7,849,459 B2* | 12/2010 | Burkhart | G06F 8/60 | 717/108 |
| 7,996,820 B2* | 8/2011 | Auvenshine | G06F 9/5061 | 705/32 |
| 8,312,417 B2* | 11/2012 | Kohli | G06F 8/34 | 717/104 |
| 8,381,242 B2* | 2/2013 | Berg | G06F 21/577 | 725/25 |
| 8,549,490 B2* | 10/2013 | Dolby | G06F 8/73 | 717/133 |
| 8,683,599 B2 | 3/2014 | Berg et al. | | |
| 8,689,229 B2* | 4/2014 | Tajima | G06F 9/4881 | 709/226 |
| 8,725,745 B2* | 5/2014 | Zargahi | G06F 8/61 | 707/754 |
| 8,731,529 B2* | 5/2014 | Lindeman | H04W 4/001 | 455/414.1 |
| 8,793,800 B2* | 7/2014 | Berg | G06F 21/577 | 726/25 |
| 8,904,004 B2* | 12/2014 | Havemose | G06F 8/61 | 709/226 |
| 8,930,886 B2* | 1/2015 | Dunker | G06F 8/75 | 717/104 |
| 8,930,916 B1* | 1/2015 | Soeder | G06F 8/75 | 717/131 |
| 8,966,457 B2* | 2/2015 | Ebcioglu | G06F 17/5045 | 716/105 |
| 8,990,771 B2* | 3/2015 | Radez | G06F 8/61 | 717/121 |
| 9,021,416 B2* | 4/2015 | Grechanik | G06F 8/20 | 707/708 |
| 9,055,120 B1* | 6/2015 | Firman | G06F 8/60 | |
| 9,086,937 B2* | 7/2015 | Arrouye | G06F 8/61 | |
| 9,118,520 B1* | 8/2015 | Mao | G06Q 10/04 | |
| 9,195,502 B2* | 11/2015 | Chung | G06F 9/5005 | |
| 9,208,055 B2* | 12/2015 | Fink | G06T 11/206 | |
| 9,432,798 B2* | 8/2016 | Raju | H04W 4/008 | |
| 9,483,255 B2* | 11/2016 | Katsaros | G06F 8/68 | |
| 2002/0131404 A1* | 9/2002 | Mehta | G06F 8/61 | 370/352 |
| 2005/0278718 A1* | 12/2005 | Griffith | G06F 9/445 | 717/175 |
| 2008/0201701 A1* | 8/2008 | Hofhansl | G06F 8/60 | 717/168 |
| 2008/0270971 A1* | 10/2008 | Agrawal | G06F 17/50 | 717/102 |
| 2008/0288965 A1* | 11/2008 | Grechanik | G06F 8/36 | 719/328 |
| 2009/0030792 A1* | 1/2009 | Khivesara | G06Q 30/0253 | 705/14.51 |
| 2009/0138898 A1* | 5/2009 | Grechanik | G06F 8/36 | 719/328 |
| 2011/0185339 A1* | 7/2011 | Andrade | G06F 8/20 | 717/104 |
| 2012/0102474 A1 | 4/2012 | Artzi et al. | | |
| 2012/0117558 A1* | 5/2012 | Futty | G06F 9/44505 | 717/176 |
| 2013/0055194 A1* | 2/2013 | Weigert | G06F 8/10 | 717/104 |
| 2013/0055212 A1* | 2/2013 | Weigert | G06F 8/10 | 717/126 |
| 2013/0117725 A1* | 5/2013 | Bnayahu | G06F 8/30 | 717/101 |
| 2013/0326481 A1* | 12/2013 | Kannan | G06F 8/71 | 717/123 |
| 2014/0053057 A1* | 2/2014 | Reshadi | G06F 17/2247 | 715/234 |
| 2014/0096129 A1* | 4/2014 | Kimmet | G06F 8/61 | 717/177 |
| 2014/0359601 A1* | 12/2014 | Constable | G06F 8/61 | 717/175 |
| 2015/0100684 A1* | 4/2015 | Maes | G06F 11/3672 | 709/224 |
| 2015/0113514 A1* | 4/2015 | Chakradhar | G06F 8/51 | 717/149 |
| 2015/0199197 A1* | 7/2015 | Maes | G06F 8/71 | 717/122 |
| 2015/0234653 A1* | 8/2015 | Fortune | G06F 8/71 | 717/121 |
| 2015/0277889 A1* | 10/2015 | Arrouye | G06F 8/61 | 717/175 |
| 2016/0179478 A1* | 6/2016 | Bates | G06F 8/34 | 717/113 |
| 2016/0179503 A1* | 6/2016 | Bates | G06F 8/34 | 717/101 |
| 2016/0239546 A1* | 8/2016 | Cuomo | G06F 8/10 | |

* cited by examiner

DETECTION OF SOFTWARE OR HARDWARE INCOMPATIBILITIES IN SOFTWARE PACKAGES

BACKGROUND

The present invention relates generally to the field of software distribution and more particularly to the detection of incompatibilities between a software package and a computing device.

Many modern software applications require a wide variety of hardware and software components in order to execute correctly. Such applications may operate within an operating system, or may be available on an application marketplace, that caters to a large number of hardware devices that include a variety of capabilities.

SUMMARY

Aspects of an embodiment of the present invention disclose a method, computer program product, and computing system for determining compatibility between a computing device and a software application. A processor receives code of a software application. A processor generates a call graph for the software application using the code, wherein the call graph describes at least a first type of hardware component required to execute the software application. A processor identifies a set of one or more hardware components included within a computing device. A processor determines whether the computing device is compatible with the software application based on, at least, the call graph and the determined set of one or more hardware components included within the computing device.

DETAILED DESCRIPTION

In general, embodiments of the present invention provide a method, computer program product, and computer system for detecting incompatibilities between a software application and a computing device which is to execute the software application. In some embodiments, the invention identifies hardware components required by the software application which are not included in the computing device, while in other embodiments, the invention identifies software components required by the software package which are not included in the computing device.

Modern software applications can be designed to operate on a wide variety of platforms and different hardware configurations. In the process of developing cross-platform software applications, many application programming interfaces (APIs) and libraries may be utilized. In some environments, such as mobile environments, the available hardware resources may vary significantly between various computing devices which utilize a software application. For example, specialized hardware components such as Bluetooth®, near-field communication (NFC) chips, or a fingerprint reader may be present in a subset of mobile devices, but absent in others.

Figure 1:
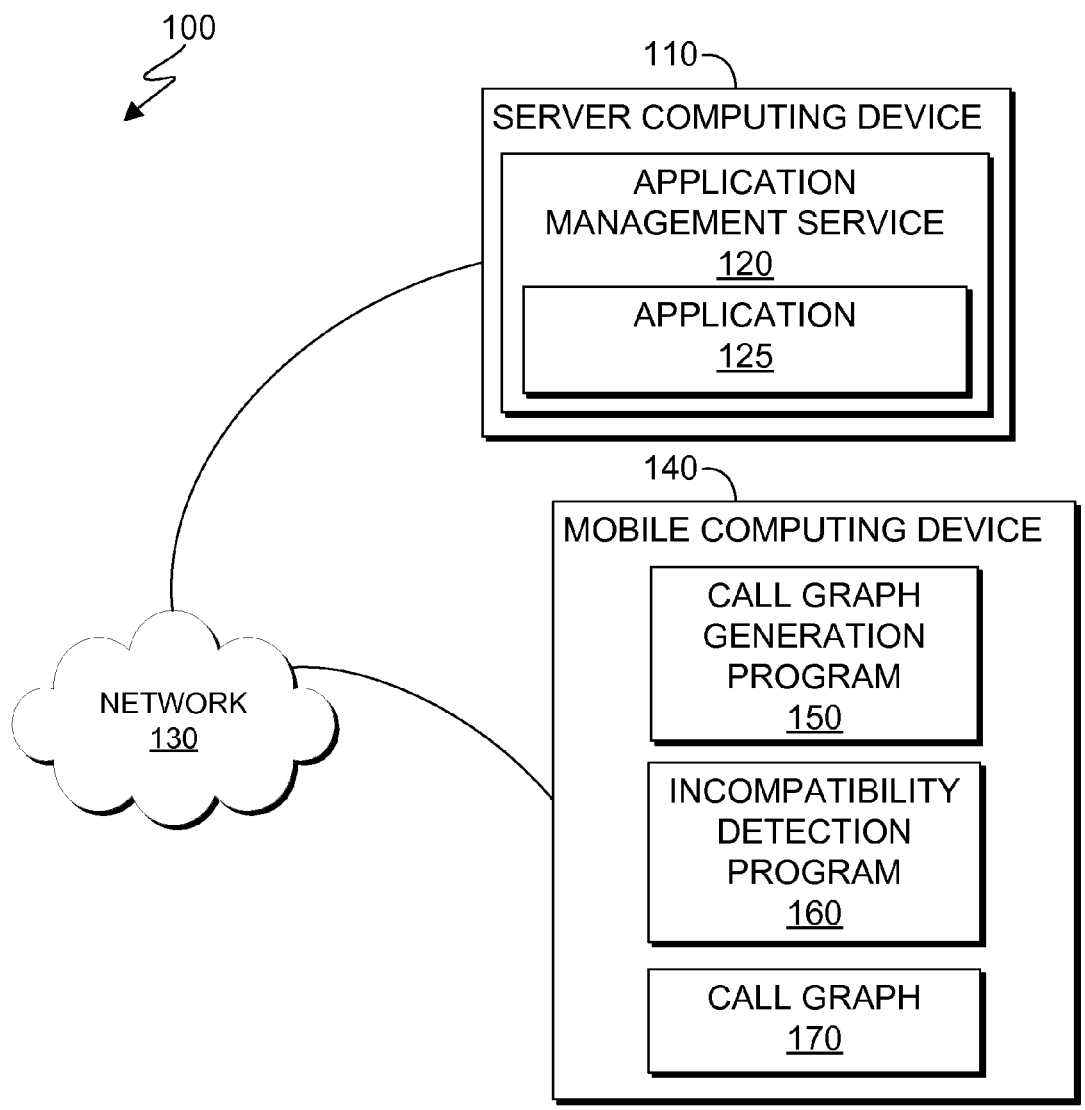
FIG. 1 is a functional block diagram illustrating a computing environment including a computing device and a mobile computing device, in accordance with an embodiment of the invention.

The present invention will now be described in detail with reference to the Figures. FIG. 1 is a functional block diagram illustrating a computing environment, generally designated 100, in accordance with one embodiment of the present invention. In the depicted embodiment, computing environment 100 includes server computing device 110, network 130, and mobile computing device 140. Further, in the depicted embodiment, server computing device 110 includes application management service 120 and application 125. In the depicted embodiment, mobile computing device 140 includes call graph generation program 150, incompatibility detection program 160, and call graph 170.

In various embodiments of the present invention, server computing device 110 and mobile computing device 140 can be servers, laptop computers, tablet computers, netbook computers, personal computers (PCs), or desktop computers. In another embodiment, server computing device 110 and mobile computing device 140 represent computing systems utilizing clustered computers and components to act as a single pool of seamless resources. In general, server computing device 110 and mobile computing device 140 can be any computing devices or combinations of devices with access to application management service 120, call graph generation program 150, incompatibility detection program 160, and network 130 and is capable of processing program instructions and executing application management service 120, call graph generation program 150, and incompatibility detection program 160, in accordance with an embodiment of the present invention. Server computing device 110 and mobile computing device 140 may include internal and external hardware components, as depicted and described in further detail with respect to FIG. 4.

Network 130 can be, for example, a local area network (LAN), a wide area network (WAN) such as the Internet, or a combination of the two, and may include wired, wireless, fiber optic or any other connection known in the art. In general, the network 130 can be any combination of connections and protocols that will support communications between server computing device 110, application management service 120 and mobile computing device 140, in accordance with an embodiment of the invention.

Application management service 120 is a repository of one or more software packages which can be downloaded by and installed onto other computing devices such as mobile computing device 140. In one embodiment of the invention, application management service 120 is an app store which hosts downloads of mobile applications such as, for example, the iOS® App Store$^{SM}$ or the Google Play™ Store. In general, application management service 120 can be any software repository or directory which is capable of storing one or more software packages and allowing software packages to be downloaded onto other computing devices such as mobile computing device 140.

Application 125 is a software application included within application management service 120, which can be downloaded onto and executed by mobile computing device 140. In general, application 125 may be any generic application and may include a variety of software and/or hardware requirements to function, either minimally or optimally.

In the depicted embodiment, application management service 120 is located on server computing device 110. However, in other embodiments, application management service 120 may be located externally and accessed through a communication network such as network 130.

Call graph generation program 150 operates to produce a call graph, such as call graph 170, which describes hardware and software resources required to execute application 125, any APIs required to execute the application, and, specifically, any methods within specific APIs which are called by the application. In various embodiment, call graph generation program 150 receives the source code or bytecode of an application as an input and produces a call graph as an output. In general, call graphs can have a variety of different formats, as described in greater detail below. In the embodiment depicted in FIG. 1, call graph generation program 150 produces call graph 170 based on the source code of application 125.

In one embodiment, such as the embodiment depicted in FIG. 1, applications, such as application 125, are downloaded by mobile computing device 140 from application management service 120. In these embodiments, call graph generation program 150 is executed by mobile computing device 140 to determine the list of requirements for executing application 125 on mobile computing device 140.

In some embodiments, call graph generation program 150 is stored on and executed by server computing device 110. In these embodiments, call graph 170 is transmitted to mobile computing device 140 to be used for executing incompatibility detection program 160.

Incompatibility detection program 160 is a computer program which identifies possible incompatibilities between the resources available to a computing device (e.g., mobile computing device 140) and the resources required to execute an application. In various embodiments, incompatibility detection program 160 receives a call graph such as call graph 170 as an input.

Call graph 170 is a call graph generated by call graph generation program 150 which lists hardware and software requirements for executing an application. In the depicted embodiment, call graph 170 describes the hardware and software requirements for executing application 125.

Figure 2:
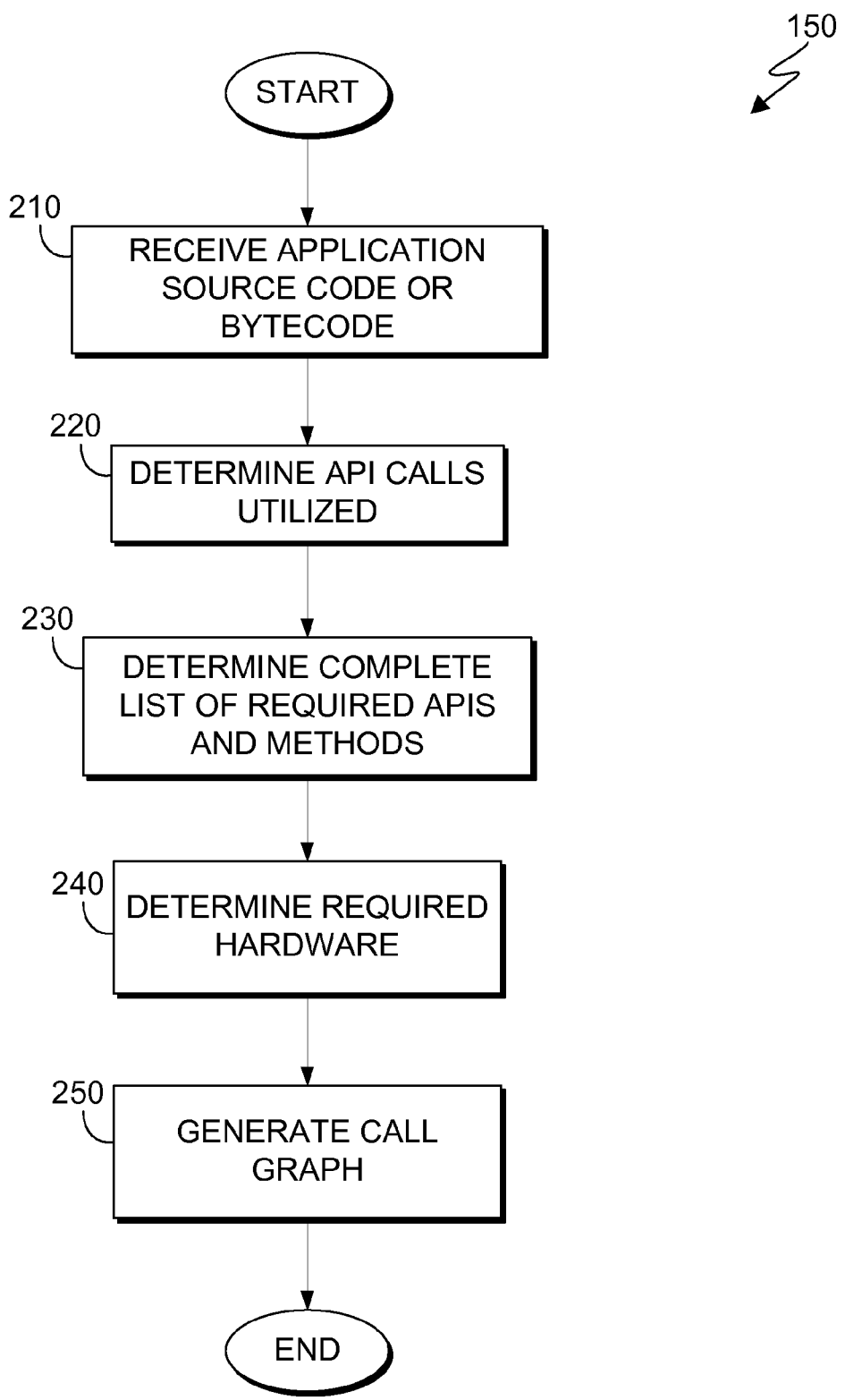
FIG. 2 is a flowchart depicting the operational steps included in a call graph generation program included in the mobile computing device of FIG. 1, for generating a list or call graph of the hardware and software components utilized by a software application, in accordance with an embodiment of the invention.

FIG. 2 is a flowchart depicting the operational steps included in call graph generation program 150 for creating a call graph which identifies the hardware and software components which are required to execute an application. For example, in accordance with the embodiment depicted in FIG. 1, call graph generation program 150 generates call graph 170 which represents the requirements for executing application 125.

In step 210, call graph generation program 150 receives the source code, object code, or bytecode of an application for which to generate a call graph. In some embodiments, the use of source code is preferred to the use of bytecode or object code for generating a call graph. Further, in embodiments where machine code or object code is utilized for generating a call graph, additional software components such as a disassembler may be required.

In step 220, call graph generation program 150 determines the list of API calls which are utilized by application 125. In general, the process of identifying an API call in the source code or bytecode of an application includes identifying calls to functions that are not either built into the programming language, included within one or more standard libraries associated with a programming language, or defined within the source code of the application.

For example, in an embodiment where the source code of an application is written in the programming language Python®, the source code of the application may include the following code:
  print("Hello")
  bluetoothAPI.send_message("Hello")

In this exemplary embodiment, the call to the function "print" is not determined to be an API call due to the fact that the "print" function is built into the Python® language, and is included on any computing device capable of executing Python® code. In various embodiments, call graph generation program 150 may receive a list of the functions which are available to mobile computing device 140 in a given language.

Further, in this exemplary embodiment, the call to the function "send_message" associated with the object "bluetoothAPI" is determined to be an API call due to the fact that the object "bluetoothAPI" and the function "send_message" are not built into the Python® language or the standard library. In some embodiments, there is an available specification indicating how particular APIs map to resources. In such embodiments, APIs can be derived from the source code of application 125 via lexical analysis and the derived APIs can be compared to such an available specification. Lexical analysis is the process of converting a sequence of characters into a sequence of tokens.

In step 230, call graph generation program 150 determines the total list of APIs and methods required to use application 125 successfully.

In one embodiment, the call graph includes a reference to a specific API every time that the API is called by application 125. As a result, each called API may be included in the call graph multiple times. In these embodiments, the list of unique APIs (i.e., the original set of APIs with duplicates removed) is identified to determine the set of APIs required to execute application 125.

In general, if multiple calls are made to the same API, only a single requirement for the API is included in the call graph.

In some embodiments, an API is determined to be required only if all methods included within the API are called by application 125. In other embodiments, an API is determined to be required if at least one method included within the API is called by application 125.

In step 240, call graph generation program 150 determines the set of hardware components which are required to use application 125 successfully. In some embodiments, call graph generation program 150 determines the set of hardware components by accessing permissions associated with application 125. Such permissions may govern the use of resources of application 125, and call graph generation program 150 may use the permission information to determine the set of hardware components which are required to use application 125 successfully.

For example, in an embodiment where the source code of application 125 includes a call to an API for transferring files using Wi-Fi®, call graph 170 includes a requirement that mobile computing device 140 must include a hardware Wi-Fi® component in order to successfully execute application 125. By examining permissions of the source code of application 125, call graph generation program 150 may be able to determine that Wi-Fi® is necessary for the compatibility of application 125.

In step 250, call graph generation program 150 generates a call graph, such as call graph 170, which represents all of the required software components and hardware components which are required to execute application 125 successfully.

In various embodiments, call graph 170 may be a chart, table, list, or a graphical representation of the requirements for executing application 125. In one embodiment, call graph 170 is a table which includes columns for the hardware resources, APIs, and methods required in order to execute application 125. In general, it is not intended for the invention to be limited to any particular type of call graph, and in various embodiments a variety of different forms for call graphs may be used.

It should be appreciated that although the term "Graph" is used to refer to a call graph, a call graph does not need to include a visual representation of the requirements of an application.

Figure 3:
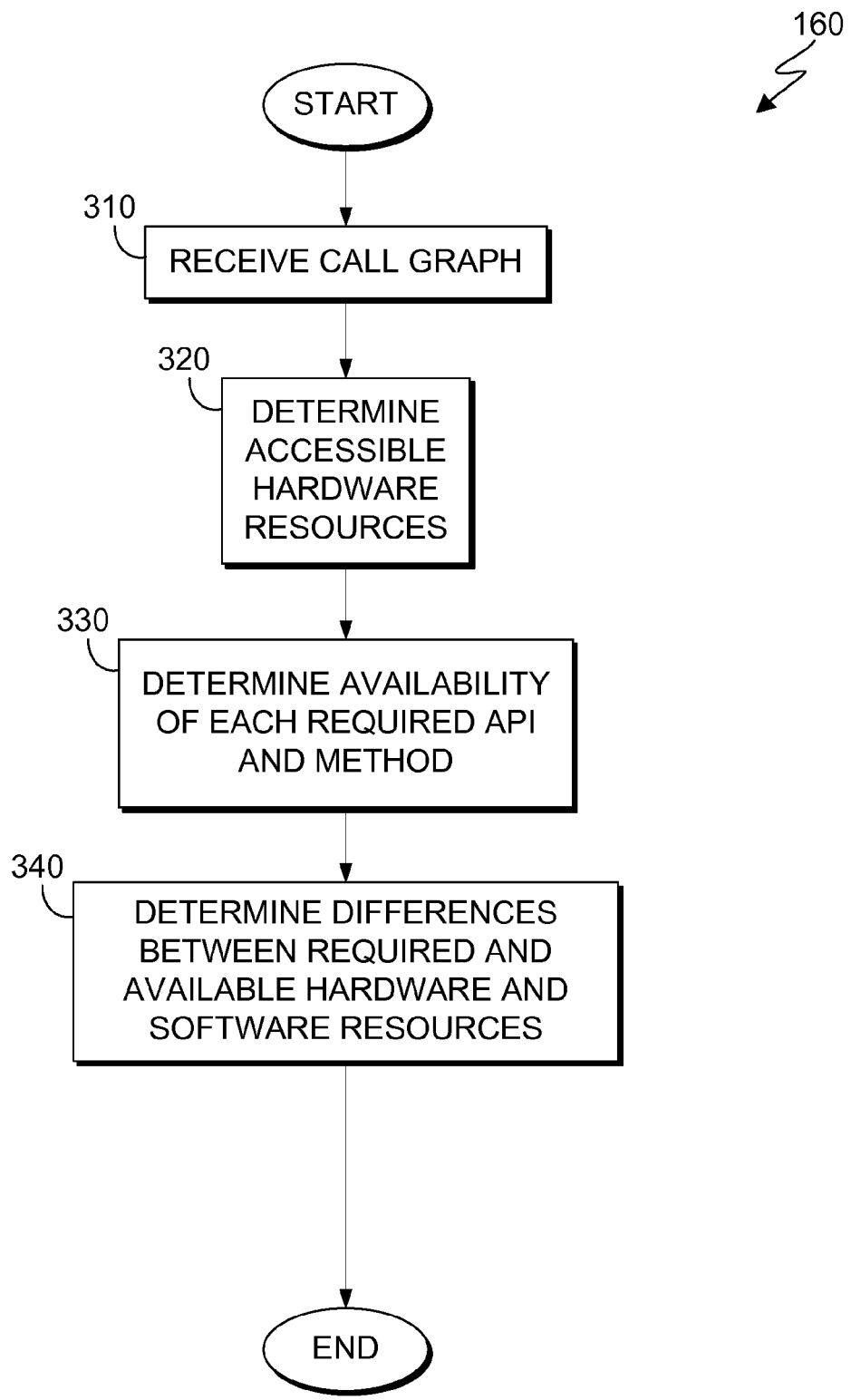
FIG. 3 is a flowchart depicting the operational steps included in an incompatibility detection program included in the mobile computing device of FIG. 1, for identifying incompatibilities between the requirements of a mobile application and the resources of a device, in accordance with an embodiment of the invention.

FIG. 3 is a flowchart depicting the operational steps included in incompatibility detection program 160 for detecting incompatibilities between application 125 and a computing device which is to execute application 125 (e.g., mobile computing device 140). In the depicted embodiment, incompatibility detection program 160 is utilized to identify one or more incompatibilities between application 125 downloaded from application management service 120 onto mobile computing device 140 and mobile computing device 140.

In step 310, incompatibility detection program 160 receives a call graph such as a call graph 170 created by call graph generation program 150, in accordance with an embodiment of the invention.

In step 320, incompatibility detection program 160 determines the list of hardware resources which are required by application 125. In one embodiment incompatibility detection program 160 determines the list of hardware resources which are required by application 125 based on the information included within call graph 170.

In step 330, incompatibility detection program 160 determines the availability of each API within the computing device (e.g., mobile computing device 140) which is indicated as being required by call graph 170.

In one embodiment, the determination of whether or not an API indicated by call graph 170 is available to mobile computing device 140 is made by searching mobile computing device 140 for an implementation of the indicated API.

In another embodiment, where the API indicated by call graph 170 is remotely stored on another computing device (such as server computing device 110) and accessed through a network such as network 130, such as a Representational State Transfer (REST) API, incompatibility detection program 160 determines whether the API is available to mobile computing device 140 is made by causing mobile computing device 140 to attempt to access the API. This approach is particularly useful for determining the availability of APIs that are maintained by third-party sources and may be discontinued or changed over time.

In other embodiments, incompatibility detection program 160 receives a list of the software resources available to mobile computing device 140. In general, this list of software resources details the complete list of APIs, and methods included within those APIs, which are accessible to mobile computing device 140. In some embodiments, this approach is preferable, such as when call graph generation program 150 and incompatibility detection program 160 are both executed by a computing device other than mobile computing device 140, such as server computing device 110.

In step 340, incompatibility detection program 160 determines any differences between the set of hardware and software resources which are available to the computing device which is to execute the application and the hardware and software resources required by the application. In one embodiment, incompatibility detection program 150 compares the set of hardware and software resources which are available to the computing device to the hardware and software resources required by the application, as indicated in call graph 170.

For example, in one embodiment, call graph 170 indicates that an application requires an NFC payment API called "NfcPay" as well as a hardware NFC chip. In this embodiment, mobile computing device 140 includes a hardware NFC chip, but does not include or have access to an "NfcPay" API. In this embodiment, incompatibility detection program 160 identifies the difference between the required resources and available resources to be the hardware NFC chip, which is required by the application but not present in mobile computing device 140.

In general, an incompatibility is determined to be present when a requirement is present within call graph 170 which is not met by the available resources of mobile computing device 140. Further, in various embodiments, mobile computing device 140 including additional resources or capabilities that are not used by application 125 will not result in the identification of additional incompatibilities.

In some embodiments, incompatibility detection program 160 may cause a notification to be displayed by mobile computing device 140 indicating whether application 125 is compatible with mobile computing device 140. In some embodiments, upon determining that application 125 is incompatible with mobile computing device 140, incompatibility detection program 160 may prevent mobile computing device 140 from installing or executing application 125. Similarly, in some embodiments, incompatibility detection program 160 may only allow mobile computing device 140 to install or execute application 125 subsequent to determining that application 125 is compatible with mobile computing device 140.

Figure 4:
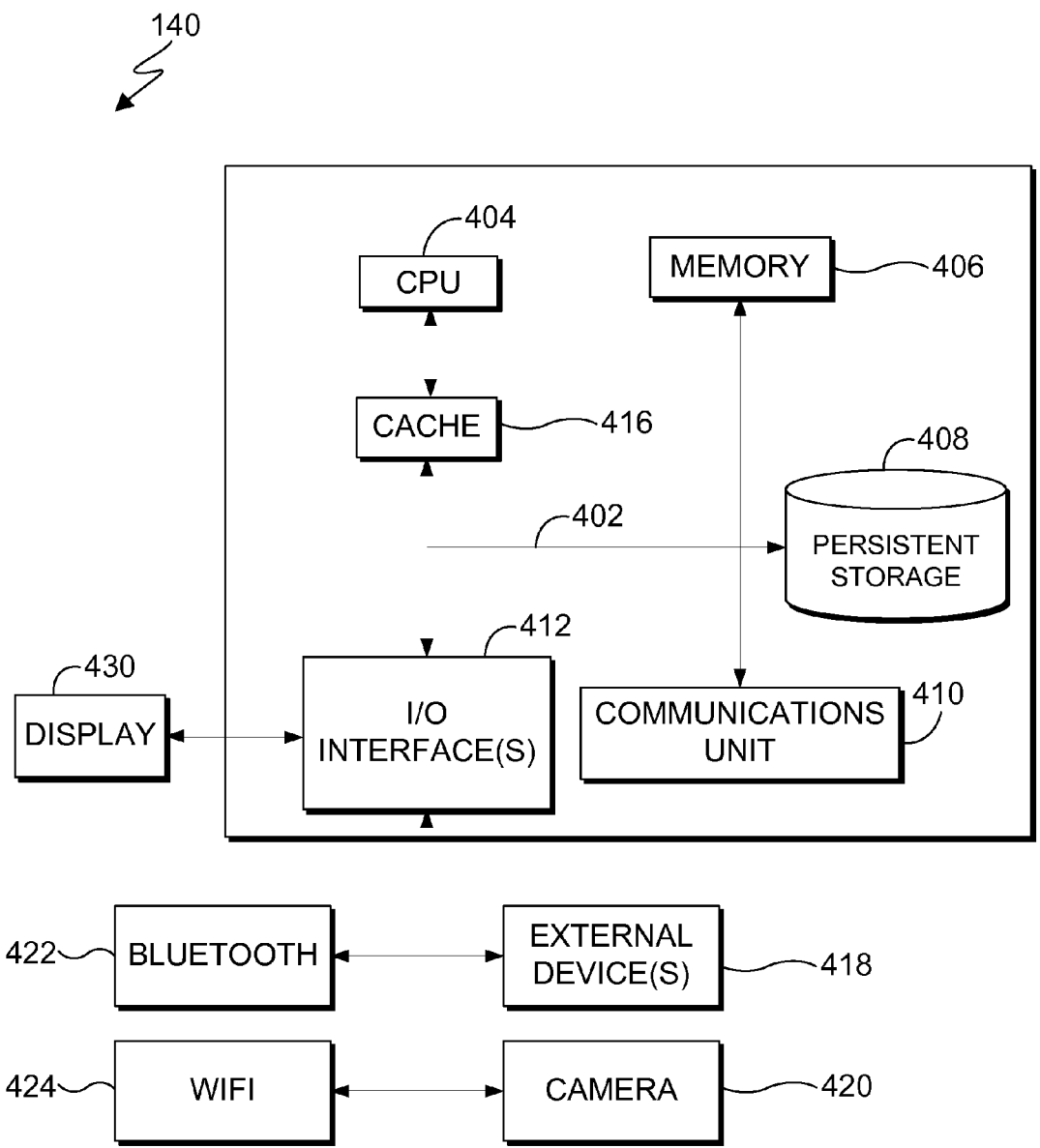
FIG. 4 is a block diagram illustrating the hardware components included in the server computing device and/or mobile computing device of FIG. 1, in accordance with an embodiment of the invention.

FIG. 4 depicts the components of mobile computing device 140, which is an example of a computing device that includes call graph generation program 150 and incompatibility detection program 160 of embodiments of the present invention. FIG. 4 also depicts components that may be present in server computing device 110. Mobile computing device 140 includes communications fabric 402, which provides communications between CPU 404, memory 406, persistent storage 408, communications unit 410, input/output (I/O) interface(s) 412, and cache 416. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data and data near accessed data from memory 406.

Program instructions and data used to practice embodiments of the present invention may be stored in persistent storage 408 for execution by one or more of the respective CPU(s) 404 via cache 416 and one or more memories of memory 406. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 430.

Display 430 provides a mechanism to display data to a user and may be, for example, a computer monitor.

Camera/microphone 420 is a camera or microphone device which is capable of recording sound and/or video information. In some embodiments camera/microphone 420 sends digital information related to the sound and/or video information captured by camera/microphone 420 to mobile computing device 140. In other embodiments, camera/microphone 420 stores digital information related to the sound and/or video information captured by camera/microphone 420 on a digital storage device included within camera/microphone 420.

Bluetooth® device 422 and Wi-Fi® device 424 are devices which facilitate transferring digital information wirelessly between mobile computing device 140 and other computing devices using Bluetooth® or Wi-Fi® technology respectively. In some embodiments, the use of APIs may be required for software executed by mobile computing device 140 to transfer data via Bluetooth® device 422 or Wi-Fi® device 424.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining compatibility between a computing device and a software application, the method comprising:
   determining, by one or more processors, a first type of hardware component required to execute a software application based, at least in part, on one or more permissions associated with a source code of the software application;
   identifying, by one or more processors, a first type of API call required to execute the software application, wherein:
   the first type of API call is a call to a function; and
   the call to the function is not:
      built into a programming language used to write the source code of the software application;
      defined within the source code of the software application; and
      included within one or more standard libraries associated with the programming language;
   identifying, by one or more processors, one or more hardware components included within a computing device; and
   determining, by one or more processors, whether the computing device is compatible with the software application based, at least in part, on:
   the first type of hardware component;
   the first type of API call; and
   the one or more hardware components.

2. The method of claim 1, further comprising:
   identifying, by one or more processors, a set of one or more APIs which are available to the computing device.

3. The method of claim 1, wherein determining whether the computing device is compatible with the software application comprises:
   comparing, by one or more processors, the one or more hardware components to the first type of hardware component.

4. The method of claim 1 further comprising:
   determining, by one or more processors, that a first hardware component of the one or more hardware components is of the first type of hardware component;
   determining, by one or more processors, whether the first hardware component is available; and
   determining, by one or more processors, whether the computing device is compatible with the software application based, additionally, on whether the first hardware component is available.

5. The method of claim 1, further comprising:
   downloading, by one or more processors, the software application to the computing device from an application store; and
   subsequent to determining that the computing device is compatible with the software application, installing, by one or more processors, the software application.

6. The method of claim 1, further comprising:
generating, by one or more processors, a call graph for the software application, wherein the call graph describes at least:
the first type of hardware component; and
the first type of API call.

7. A computer program product for determining compatibility between a computing device and a software application, the computer program product comprising:
one or more computer readable storage medium and program instructions stored on the one or more computer readable storage medium, the program instructions comprising instructions to:
determine a first type of hardware component required to execute a software application based, at least in part, on one or more permissions associated with a source code of the software application;
identify a first type of API call required to execute the software application, wherein:
the first type of API call is a call to a function: and the call to the function is not:
built into a programming language used to write the source code of the software application;
defined within the source code of the software application; and included within one or more standard libraries associated with the programming language;
identify one or more hardware components included within a computing device; and
determine whether the computing device is compatible with the software application based, at least in part, on:
the first type of hardware component;
the first type of API call; and
the one or more hardware components.

8. The computer program product of claim 7, further comprising instructions to:
identify a set of one or more APIs which are available to the computing device.

9. The computer program product of claim 7, wherein the instructions to determine whether the computing device is compatible with the software application further comprise instructions to:
compare the one or more hardware components to the first type of hardware component.

10. The computer program product of claim 7, further comprising instructions to:
determine that a first hardware component of the one or more hardware components is of the first type of hardware component;
determine whether the first hardware component is available; and
determine whether the computing device is compatible with the software application based, additionally, on whether the first hardware component is available.

11. The computer program product of claim 7, further comprising instructions to:
download the software application to the computing device from an application store; and
subsequent to determining that the computing device is compatible with the software application, install the software application.

12. The computer program product of claim 7, further comprising instructions to:
generate a call graph for the software application, wherein the call graph describes at least:
the first type of hardware component; and
the first type of API call.

13. A computer system for determining compatibility between a computing device and a software application, the computer system comprising:
one or more computer processors, one or more computer readable storage medium, and program instructions stored on the one or more computer readable storage medium for execution by at least one of the one or more processors, the program instructions comprising instructions to:
determine a first type of hardware component required to execute a software application based, at least in part, on one or more permissions associated with a source code of the software application;
identify a first type of API call required to execute the software application, wherein:
the first type of API call is a call to a function; and the call to the function is not:
built into a programming language used to write the source code of the software application;
defined within the source code of the software application; and
included within one or more standard libraries associated with the programming language;
identify one or more hardware components included within a computing device; and
determine whether the computing device is compatible with the software application based, at least in part, on:
the first type of hardware component;
the first type of API call; and
the one or more hardware components.

14. The computer system of claim 13, further comprising instructions to:
identify a set of one or more APIs which are available to the computing device.

15. The computer system of claim 13, wherein the instructions to determine whether the computing device is compatible with the software application further comprise instructions to:
compare the one or more hardware components to the first type of hardware component.

16. The computer system of claim 13, further comprising instructions to:
determine that a first hardware component of the one or more hardware components is of the first type of hardware component;
determine whether the first hardware component is available; and
determine whether the computing device is compatible with the software application based, additionally, on whether the first hardware component is available.

17. The computer system of claim 13, further comprising instructions to:
generate a call graph for the software application, wherein the call graph describes at least:
the first type of hardware component; and
the first type of API call.

18. The computer system of claim 13, further comprising instructions to:
download the software application to the computing device from an application store; and
subsequent to determining that the computing device is compatible with the software application, install the software application.

* * * * *